US008490179B2

(12) United States Patent
Proudler

(10) Patent No.: US 8,490,179 B2
(45) Date of Patent: Jul. 16, 2013

(54) COMPUTING PLATFORM

(75) Inventor: Graeme John Proudler, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 517 days.

(21) Appl. No.: 12/606,763

(22) Filed: Oct. 27, 2009

(65) Prior Publication Data

US 2011/0099627 A1    Apr. 28, 2011

(51) Int. Cl.
*G06F 21/00*    (2013.01)
(52) U.S. Cl.
USPC ........................................................ 726/21
(58) Field of Classification Search
USPC ....................................................... 726/2, 21
See application file for complete search history.

(56) References Cited

U.S. PATENT DOCUMENTS

| | | | | |
|---|---|---|---|---|
| 2005/0108564 A1* | 5/2005 | Freeman et al. | | 713/200 |
| 2005/0223221 A1 | 10/2005 | Proudler et al. | | |
| 2008/0077801 A1* | 3/2008 | Ekberg | | 713/187 |
| 2008/0126779 A1* | 5/2008 | Smith | | 713/2 |
| 2009/0210705 A1* | 8/2009 | Chen | | 713/158 |
| 2009/0234980 A1* | 9/2009 | Barrenscheen et al. | | 710/18 |
| 2010/0125731 A1* | 5/2010 | Dasari et al. | | 713/155 |

FOREIGN PATENT DOCUMENTS

WO    WO-00/73913    12/2000

OTHER PUBLICATIONS

TCG Physical Presence Interface Specification, Version 1.10 Final Revision 1.00, Jun. 10, 2009, for TPM Family1.2; Level 2.

* cited by examiner

*Primary Examiner* — Brandon Hoffman
*Assistant Examiner* — Anthony Brown

(57) ABSTRACT

The present application describes a computing platform incorporating a trusted entity and storing, in non-volatile memory, one or more indicators, which indicate a current update status of an executable program code, and one or more expected values associated with measurement of the program code, the trusted entity being programmed to update the one or more indicators, by reference to the expected values, in response to a measured change in a current update status of the program code.

18 Claims, 10 Drawing Sheets

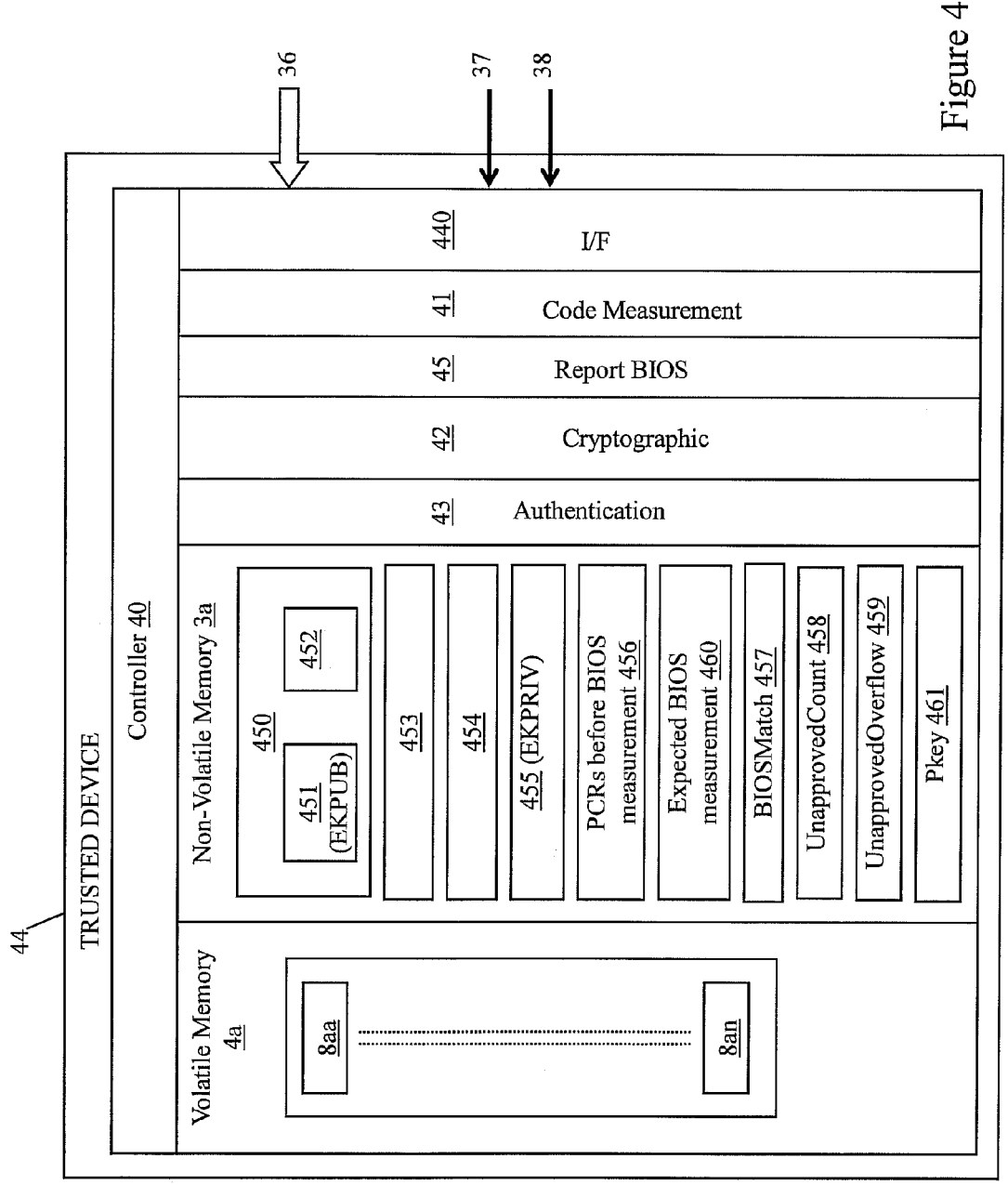

COMPUTING PLATFORM

BACKGROUND

A user should not replace important control firmware, for example a Basic Input/Output System (BIOS) firmware in a computing platform, unless the replacement is via an approved process using approved firmware. Typically, approved firmware is provided by the computer platform manufacturer (often referred to as the OEM, or original equipment manufacturer) or other party trusted by the OEM. This is because the firmware in a BIOS typically controls the platform to augment platform hardware and other firmware, ensures that the platform operates within safe working parameters (such as safe supply voltages and chip temperatures), and/or affects the security of the platform (for example, because a BIOS may contain a root of trust in a so-called 'trusted platform'). If an unapproved BIOS is installed, it may prevent the platform from working properly, operate the platform outside a safe zone and cause actual damage to the platform, degrade the lifetime of the platform, or degrade the security of the platform. Moreover, if an unapproved BIOS is replaced subsequently with an approved BIOS, all evidence of the unapproved BIOS may be removed from the platform, potentially leaving the platform damaged or degraded without evidence as to why, and/or leaving no evidence that the correct operation or security of the platform may have been compromised.

While it would be an option to provide mechanisms which prevent BIOS replacement (for example by preventing re-flashing), this might deter parties having legitimate reasons for updating a BIOS from buying the respective platforms, or stimulate the emergence of the production of "mod-chips", for example, which can be piggy-backed onto BIOS chips, thereby to modify the operation of the BIOS in a known and potentially subversive way. Such physical alterations are very difficult (and even sometimes impossible) to remotely detect, can subvert the security of a trusted platform, and could damage the market for trusted platforms, by damaging overall confidence that trustable remote communications are possible with trusted platforms. Therefore, preventing BIOS replacement entirely may not be an appropriate solution.

Some trusted computing platforms contain a component, known as a Trusted Platform Module (TPM), which is at least logically protected from subversion. Such components have been developed by the companies forming the Trusted Computing Group (TCG). The TCG develops specifications in this area, for example the "TCG TPM Specification" Version 1.2, which is published on the TCG website https://www.trustedcomputinggroup.org/. The implicitly trusted components of a trusted computing platform enable measurements of the trusted computing platform and are then able to provide these in the form of integrity metrics to appropriate entities wishing to interact with the trusted computing platform. The receiving entities are then able to determine from the consistency of the measured integrity metrics with known or expected values that the trusted computing platform is operating as expected.

Trusted computing platforms of this kind should only operate with approved BIOS firmware, and mechanisms can be provided to prevent BIOS upgrades unless the firmware is cryptographically verified in an appropriate way. Outside of trusted computing, similar issues arise with motor vehicles, and the ability to 'chip' engine management firmware to improve performance; but risking damage to the vehicle by over-stressing.

BRIEF DESCRIPTION OF THE DRAWINGS

Various features and advantages of the invention will become apparent from the following description of embodiments of the invention, given by way of example only, which is made with reference to the accompanying drawings, of which:

FIG. 3b illustrates the known prior-art process of extending values into a platform configuration register of the trusted device of FIG. 3a;

FIG. 4 indicates the functional elements of a trusted entity according to an embodiment of the present invention;

DETAILED DESCRIPTION

Figure 1:
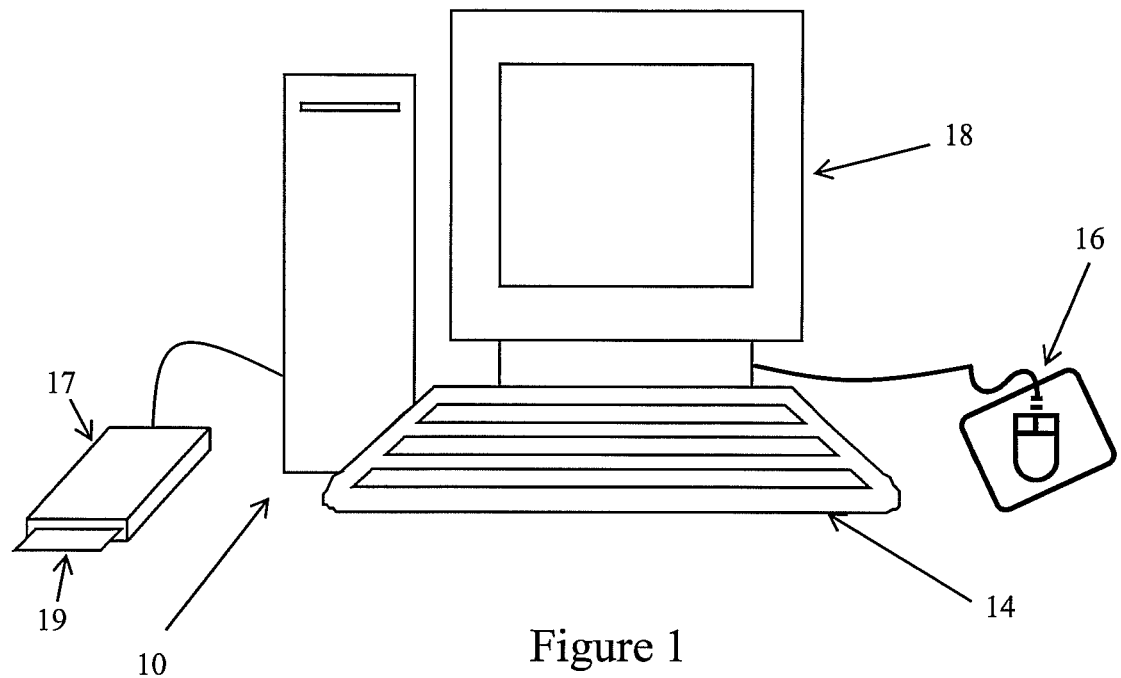
FIG. 1 is an illustration of an exemplary prior-art computing platform.

BIOS programs for computing platforms are typically supplied by the respective OEM and typically execute at platform initialisation. However, BIOS programs and, indeed, other programs supplied by an OEM, may in addition, or alternatively, execute after an operating system (OS) is installed in a platform. Such programs are System Management functions that can use System Management Memory (SMM) and can be invoked via System Management Interrupts (SMI), which typically take a higher priority than other interrupts. SMM typically comprises a dedicated memory space, which is not visible to (and therefore not addressable directly by) the OS and application software. While embodiments of the present invention to be described hereinafter refer to a 'boot process', or a 'trusted boot process' (each typically including execution of a BIOS), in order to perform certain operations before an OS is invoked, it will be understood that the operations may in addition, or alternatively, be caused or performed by System Management functions, and/or by the OS or applications in cooperation with System Management functions. In particular, it should be understood that, although (typically) it may be a BIOS that obtains permission from a user to perform an operation (as will be described), for example, the operation may be performed using System Management functions, after the OS is executing on the platform. It is conceivable that, in alternative embodiments, other software (such as a hypervisor or software that acts as a dedicated appliance) might be used in addition, or alternatively, to obtain permission Those skilled in the art will be aware that BIOS programs may communicate with and/or initialise System Management functions. Those skilled in the art will also be aware of the functional constraints that exist because System Management functions are orthogonal to the OS, in the sense that either System Management functions execute or the OS executes (but never both at the same time).

As used herein, the term "computing platform" is to be understood as encompassing any apparatus capable of effecting computation and is not limited to computers; for example, digital cellular equipment (including mobile telephones) and personal digital assistants (PDAs) have substantial computing capability and are within the scope of the term "computing platform"; and the term 'trusted platform' is equally broad. In addition, the term computing platform herein includes, except where the context otherwise requires, a virtual computing platform environment, which is substantially independent (e.g. encapsulated or compartmentalised) of other such computing environments, which all reside on a common physical computing platform under the control of a hypervisor. A fuller description of various forms of trusted platform of this type can be found in US published patent application US 2005/0223221, incorporated herein by reference.

A trusted entity that imbues trust upon a trusted platform can be embodied as a hardware component (which may include a program-controlled processor) or in software for execution by a main processor of the platform (in which case it is usually referred to as a 'virtual' trusted entity or, in the case of a TPM, a virtual TPM). In practice, virtual trusted entities are normally provided on platforms that have a basic hardware trusted component for the basic platform environment but which employ further trusted entities for virtual environments created on the platform. A hardware trusted component is usually physically bound to the platform with which it is associated whereas a software trusted entity is logically bound to the platform with which it is associated. It is, of course, also possible to implement a trusted entity as a combination of hardware component and software intended for execution on the platform. The functionality of the trusted entity can be distributed between multiple devices (in the case of a hardware embodiment) or code blocks (in the case of a 'virtual' embodiment). Embodiments of the present invention will be described with reference to a hardware trusted component, but relate equally to virtual or software trusted entities. For convenience, and unless the context dictates otherwise, a reference to a trusted component (in the description and in the appended claims) applies equally to a hardware, a software or a virtual trusted entity.

A hardware trusted component preferably consists of one physical component that is tamper-resistant. Techniques relevant to tamper-resistance are well known to those skilled in the art of security. These techniques include methods for resisting tampering (such as appropriate encapsulation of the trusted entity), methods for detecting tampering (such as detection of out of specification voltages, X-rays, or loss of physical integrity in the trusted entity casing), and methods for eliminating data when tampering is evident. As regards a 'virtual' trusted entity, although software may not afford such a high degree of tamper-resistance as a hardware device, this may be compensated for by additional protection measures. For example, the software code may include self-test functions, to check the integrity of the trusted functionality.

In the present context "trust" is the expectation that a device will behave in a particular manner for a specific purpose (i.e. the device is trustable), and a "user" can be a local user or a remote user such as a remote computing entity.

An example of a prior art trusted computing platform is illustrated in the diagram in FIG. 1. A platform 10 is shown as a so-called personal computer and is entirely conventional in appearance—it has associated the standard features of a keyboard 14, mouse 16 and visual display unit (VDU) 18, which provide the physical 'user interface' of the platform. In addition, the platform may have associated security devices, such as a smart card reader 17 for reading a smart card 19. Such security devices provide the platform with the capability to enact two-factor authentication. Additional or alternative security devices (not shown) may include biometric readers, such as finger print readers or iris readers. The platform 10 is arranged to run a standard OS such as Microsoft™ Windows XP™.

Figure 2:
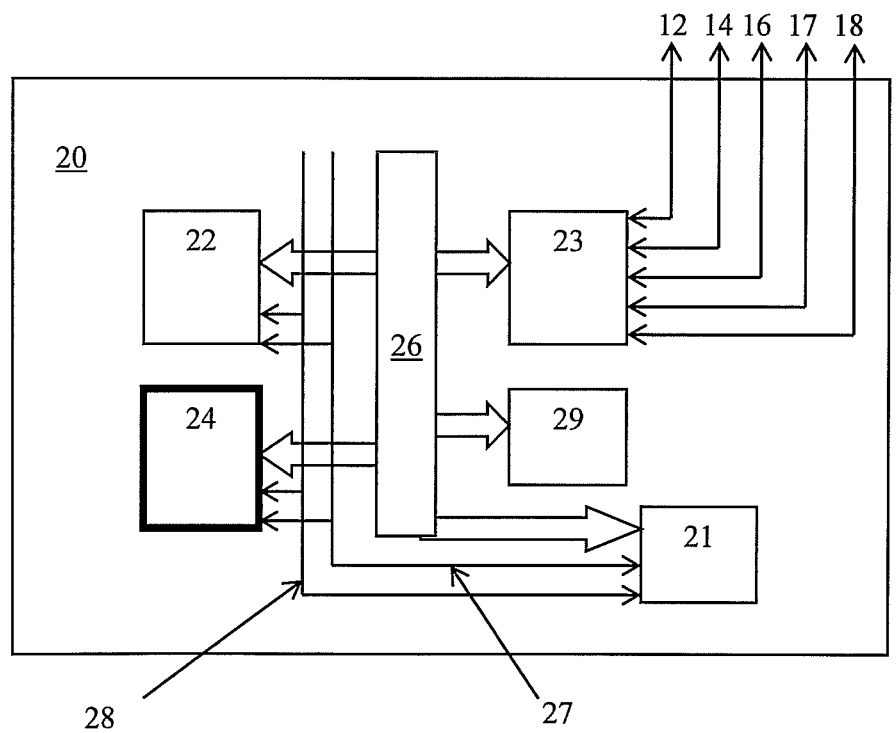
FIG. 2 indicates functional elements present on the motherboard of a prior-art trusted computing platform.

As illustrated in FIG. 2, the motherboard 20 of the trusted platform 10 includes (among other standard components) a main processor 21, main memory 22, a hardware trusted component 24 (such as a hardware TPM), a data bus 26 and respective control lines 27 and address lines 28, BIOS memory 29, typically comprising non-volatile RAM (NV-RAM), containing the BIOS program for the platform 10, an Input/Output (IO) device 23, which controls interaction between the components of the motherboard and the keyboard 14, the mouse 16 and the VDU 18, and an I/O device 25, for example an Ethernet controller, for controlling communications with remote devices or systems. The main system memory 22 is typically random access memory (RAM). In operation, the platform 10 loads the OS, in this case Windows XP™, into RAM from hard disk (not shown). Additionally, in operation, the platform 10 loads the processes or applications that may be executed by the platform 10 into RAM from hard disk (not shown). The mounting of the trusted component 24 on the mother board serves to bind it to the platform.

Typically, in a personal computer, the BIOS program is located in a special reserved memory area, such as the upper 64K of the first megabyte of the system memory (addresses FØØØh to FFFFh), and the main processor is arranged to look at this memory location first, in accordance with an industry wide standard. A significant difference between the trusted platform under discussion and a conventional platform is that, after reset, the main processor is initially controlled by special trusted code called the core root of trust for measurement (CRTM) code (which in the present example comprises hash function code stored in the trusted component 24) which then hands control over to the platform-specific trusted BIOS program, which in turn initialises all input/output devices as normal. After the BIOS program has executed, control is handed over as normal by the BIOS program to an OS program, such as Windows XP™, which is typically loaded into main memory 22 from a hard disk drive (not shown). Hereinafter, a trusted BIOS program in combination with the CRTM code, and, indeed, any other kind of bootstrap code in a trusted platform that is responsible for taking measurements and initialising hardware before an OS takes over, will be referred to herein as the 'trusted boot process'.

Figure 3A:
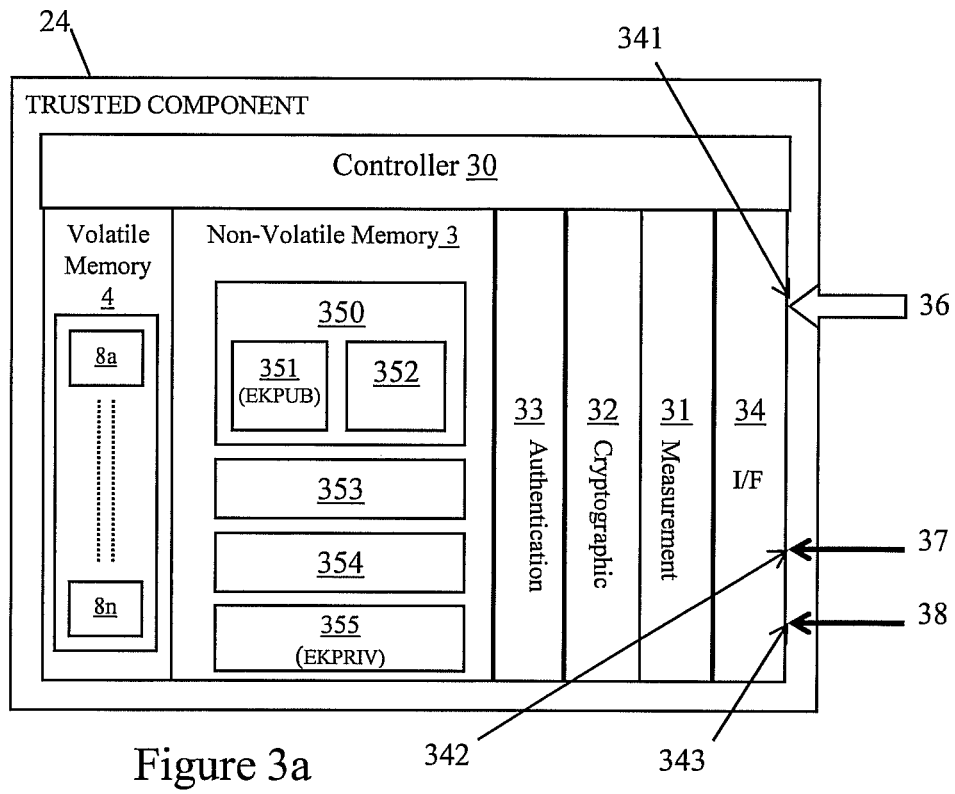
FIG. 3a indicates the functional elements of a prior-art trusted device of the trusted computing platform of FIG. 2.

An exemplary hardware trusted component 24 comprises a number of blocks, as illustrated in FIG. 3a. As already indicated, after system reset the trusted component 24 participates in a trusted boot process to ensure that the operating state of the platform 10 is recorded in a secure manner. During the trusted boot process, the trusted component 24 acquires at least one integrity metric of the computing platform 10. The trusted component 24 can also perform secure data transfer and, for example, authentication between it and a smart card via encryption/decryption and signature/verification. The trusted component 24 can also securely enforce various security control policies, such as locking of the user interface; in a particularly preferred arrangement, the display driver (or at least a trusted part thereof) for the computing platform is located within the trusted component 24 with the result that a local user can trust the display of data provided by the trusted component 24 to the display—this is further described in the applicant's International Patent Application No. PCT/GB00/02005, entitled "System for Providing a Trustworthy User Interface" and filed on 25 May 2000, the contents of which are incorporated by reference herein.

Specifically, the trusted component 24 in the present embodiment comprises: a controller 30 programmed to control the overall operation of the trusted component 24, and interact with the other functions on the trusted component 24 and with the other devices on the motherboard 20; a measurement function 31 for acquiring at least a first integrity metric from the platform 10 either via direct measurement or alternatively indirectly via executable instructions to be executed on the platform's main processor; a cryptographic function 32 for signing, encrypting/decrypting specified data; an authentication function 33 for authenticating a smart card; and interface circuitry 34 having appropriate ports (36, 37 & 38) for connecting the trusted component 24 respectively to the data bus 26, control lines 27 and address lines 28 of the motherboard 20. Each of the blocks in the trusted component 24 has access (typically via the controller 30) to appropriate volatile memory areas 4 and/or non-volatile memory areas 3 of the trusted component 24. As has already been described, the trusted component 24 is designed, in a known manner, to be tamper resistant.

For reasons of performance, the trusted component 24 may be implemented as an application specific integrated circuit (ASIC). However, for flexibility, the trusted component 24 is preferably an appropriately programmed micro-controller. Both ASICs and micro-controllers are well known in the art of microelectronics and will not be considered herein in any further detail.

The non-volatile memory 3 of the trusted component 24 stores a private key 355 (PRIVEK) of an Endorsement key (EK) pair specific to the trusted component 24; preferably, the non-volatile memory 3 also stores a certificate 350 containing at least the public key 351 (PUBEK) of the Endorsement key pair of the trusted component 24 and an authenticated value 352 of at least one platform integrity metric measured by a trusted party (TP). The certificate 350 is signed by the TP using the TP's private key prior to it being stored in the trusted component 24. In later communications sessions, a user of the platform 10 can deduce that the public key belongs to a trusted component by verifying the TP's signature on the certificate. Also, a user of the platform 10 can verify the integrity of the platform 10 by comparing one or more acquired integrity metric(s) with the authentic integrity metric value(s) 352. If there is a match, the user can be confident that the platform 10 has not been subverted. Knowledge of the TP's generally-available public key enables simple verification of the certificate 350. The non-volatile memory 35 may also contain an identity (ID) label 353. The ID label 353 is a conventional ID label, for example a serial number, which is unique within some context. The ID label 353 is generally used for indexing and labeling of data relevant to the trusted component 24, but is insufficient in itself to prove the identity of the platform 10 under trusted conditions. In the present context, a user typically interacts with the trusted component 24 via a software application.

As already indicated, the trusted component 24 cooperates with other elements of the platform 10 to reliably acquire at least one integrity metric of the platform. In the present embodiment, a first integrity metric is acquired by having the main platform processor execute the CRTM code 354 that is stored in the non-volatile memory 3 of the trusted component 24; the CRTM, when executed by the platform processor, generates a digest of the BIOS instructions in the BIOS memory and passes it to the measurement function for storage. Such an acquired integrity metric, if verified as described above, gives a potential user of the platform 10 a high level of confidence that the platform 10 has not been subverted at a hardware, or BIOS program, level.

It would alternatively be possible to provide a measurement engine within the trusted component and have this engine form an integrity measurement on the BIOS code on platform start up (reset).

Figure 3B:
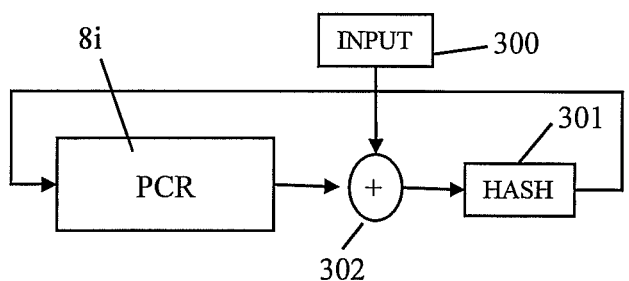

In the present example, the measurement function 31 has access to the non-volatile memory 3 (for accessing the CRTM hash code 354) and volatile memory 4 (for storing acquired integrity metric measurements). The trusted component 24 has limited memory, yet it may be desirable to store information relating to a large number of integrity metric measurements. This is done in trusted computing platforms as described by the Trusted Computing Group by the use of Platform Configuration Registers (PCRs) 8a-8n. The trusted component 24 has a number of PCRs of fixed size (the same size, 160-bits, as a standard measurement digest)—on initialisation of the platform, these are set to a fixed initial value. Integrity measurements are then "extended" into PCRs by a process shown in FIG. 3b. The PCR 8i value is concatenated 302 with the input 300 which is the value of the integrity measurement to be extended into the PCR. The concatenation is then hashed 301 to form a new 160 bit value. This hash is fed back into the PCR to form the new value of the integrity metric concerned. In addition to the extension of the integrity measurement into the PCR, to provide a clear history of measurements carried out the measurement process may also be recorded in a conventional log file (which may be simply in main memory of the computer platform). For trust purposes, however, it is the PCR value that will be relied on and not the software log. PCR values exist in volatile memory 4 of the trusted component and must, therefore, be calculated each time the platform is reset or restarted.

Clearly, there are a number of different ways in which an initial integrity metric value may be calculated, depending upon the scope of the trust required. The measurement of the BIOS program's integrity provides a fundamental check on the integrity of a platform's underlying processing environment. The integrity metric measurement should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

A trusted computing platform may also provide, in addition to PCRs, trustable storage for securely storing data in encrypted form and for ensuring that access to this data only occurs in a named environment. For example, according to TGC specifications, an opaque blob (or simply 'blob') in general comprises stored data which is cryptographically sealed to a particular platform state, for example identified by particular PCR values. The particular platform state may be a current state (at the time of sealing) or any state that the data owner deems suitable. The foregoing trusted features will normally involve the use of cryptographic functions.

A user can verify the correct operation of a trusted computing platform, for example, before exchanging data with the platform, by requesting the trusted platform to provide one or more integrity metrics. The user receives the integrity metric or metrics, and compares them against values which he believes to be true (these values being provided by a TP that is prepared to vouch for the trustworthiness of the platform or by another party the user is willing to trust). If there is a match, the implication is that at least part of the platform is operating correctly, depending on the scope of the integrity metric. If there is no match, the assumption is that the entire platform has been subverted and cannot be trusted (unless isolation technologies are employed to restrict the scope of what cannot be trusted).

Once a user has established trusted operation of the platform, he exchanges data with the platform. For a local user, the exchange might be by interacting with some software application running on the platform. For a remote operator, the exchange might involve a secure transaction. In either case, the data exchanged is preferably 'signed' by the trusted platform. The user can then have greater confidence that data is being exchanged with a platform whose behaviour can be trusted. Data exchanged may be information relating to some or all of the software running on the computer platform.

In existing implementations, a trusted platform OEM produces a trusted platform, including installing a trusted component, a trusted CRTM (typically as part of the BIOS) and an identifier (ID) of the platform. In addition, it is typically the case that only the OEM can produce and provide a new BIOS and mechanisms to update the BIOS, by flashing the BIOS memory 29.

Exemplary Embodiment

Embodiments of the present invention facilitate the generation and installation of a BIOS by parties other than the OEM, without having the prior approval of the OEM. As such, a party that has a reason to use a particular BIOS that has not been approved can do so without having to seek approval of the OEM or tamper with any platform hardware. Equally, OEMs do not have to provide alternative variants of trusted platforms to accommodate such parties' legitimate requirements. Although the following examples concentrate on updating motherboard BIOS firmware, the principles apply equally to updating any other kind of program code, such as firmware or software, and the claims should be construed accordingly.

In an embodiment to be described, a currently installed BIOS incorporates a BIOS update routine. When the BIOS receives a request to update the BIOS with an unapproved BIOS, the update is still permitted, while a trusted component is programmed to record that fact in a manner that can be revealed to a remote party who wishes to interact with the platform; thereby giving remote parties notice that the platform BIOS has been updated by an unapproved version (and may thereby have been subverted). This gives the remote party the option of not interacting with the platform. In addition, the trusted component is programmed so that data which has been sealed, while the platform was operating under an approved BIOS, cannot be recovered and returned to a user if the BIOS has been replaced by an unapproved variant; thereby protecting the data in case the platform has been subverted by replacement of the BIOS. Of course, a party that wishes legitimately to update the BIOS in a platform belonging to them should take steps to recover any such sealed data before updating the BIOS to avoid risk of loss of data due to its being rendered unrecoverable. Indeed, BIOS replacement should be attended to before the platform is used, to avoid any risk of losing access to data. As used herein, the term 'approved BIOS' implies that the firmware has been authored by or accredited (directly or indirectly) by the OEM, a trusted proxy thereof or an equivalent entity.

A trusted component according to an exemplary embodiment of the present invention comprises a number of blocks, as will now be described with reference to FIG. 4. Many of the blocks and aspects of the operation of the trusted component 44 are in common with the known trusted component 24 of FIG. 3, and will not be described in detail again. Indeed, the trusted component 44 according to the present embodiment has functionality that is a superset of the functionality of the trusted component 24 in FIG. 3; although this need not be the case in other embodiments.

Specifically, the trusted component 44 in the present embodiment comprises: a controller 40 programmed to control the overall operation of the trusted component 44, and interact with the other functions on the trusted component 44 and with the other devices on a suitable motherboard, for example motherboard 20, of a computing platform 10; a code measurement function 41 (equivalent to measurement function 31) for acquiring a first and subsequent integrity metrics from the platform either via direct measurement or alternatively indirectly via executable instructions to be executed on the platform's main processor; a fixed cryptographic function 42 (equivalent to cryptographic function 32) for signing, encrypting/decrypting specified data, using algorithms that are shipped with the device; an authentication function 43 (equivalent to authentication function 33) for authenticating a smart card; and interface circuitry 440 (equivalent to interface circuitry 34) having appropriate ports (36, 37 & 38) for connecting the trusted component 44 respectively to a data bus 26, control lines 27 and address lines 28 of motherboard 20. Each of the blocks in the trusted component 44 has access (typically via the controller 40) to appropriate volatile memory areas 4a and/or non-volatile memory areas 3a of the trusted component 44. In addition, the trusted component 44 is designed, in a known manner, to be tamper resistant.

As with trusted component 24, the trusted component 44 may be implemented as an ASIC or as an appropriately programmed micro-controller.

The non-volatile memory 3a of the trusted component 44 stores a private key 455 (EKPRIV) of an Endorsement key (EK) pair specific to the trusted component 44; preferably, the non-volatile memory 3a also stores a certificate 450 containing at least the public key 451 (EKPUB) of the Endorsement key pair of the trusted component 44 and an authenticated value 452 of at least one platform integrity metric measured by a TP. The certificate 450 is signed by the TP using the TP's private key prior to it being stored in the trusted component 44. The keys and certificates are employed in use as already described above. The non-volatile memory 3a may also contain an identity (ID) label 453 as above.

The trusted component 44 also includes in non-volatile memory 3a CRTM code 454, and in volatile memory 4a PCR registers 8aa-8an; both of which are functionally equivalent in operation and use to the counterpart elements in trusted component 24.

In addition to the hitherto known elements, the trusted component 44 comprises a reporting function 45 for reporting an update status. In this example, the reporting function 45 is a report BIOS function, which is operable to report a 'current update status' of the currently installed BIOS, as will be described below. Other additional or alternative reporting functions may be provided to report an update status of other software and/or firmware of the platform. Further, the trusted component 44 includes in non-volatile memory 3a three status indicators. Again, in this example, the status indicators relate to the BIOS, as will be described, but other kinds and/or numbers of such status indicators may be provided for other software and/or firmware of the platform. The present status indicators are: a BIOSMatch flag 457, which indicates whether a current BIOS measurement matches an expected BIOS measurement; an unapprovedCount register 458, which records the number of instances when the current BIOS measurement failed to match the expected BIOS measurement; and an unapprovedOverflow flag 459, which can transition from zero to one but not from one to zero, and is set to one by the trusted component whenever the unapprovedCount register 458 overflows. Finally, the trusted component 44 includes in non-volatile memory 3a two expected values: 'PCRs prior to BIOS measurement' value(s) 456, which indicate the platform state when the trusted component will record a BIOS measurement 456 (in the simplest case, these values are merely the PCR reset values); and an 'expected BIOS measurement' value 460. Again, similar expected values could be provided for other software and/or firmware of the platform.

In contrast with known PCRs, the status indicators and expected values are persistent values stored in non-volatile memory 3a, and so remain in the trusted component 44 even after reset or power-down. The purpose of these indicators and expected values will be described in detail below.

In addition, in general, it is assumed that the trusted component 44 contains a copy or digest 461 of one or more public keys used to verify the fields described above with reference to the BIOS data file, which is described below.

An exemplary BIOS update procedure will now be described with reference to the trusted component 44, according to an embodiment of the invention, as illustrated by the flow diagram in FIG. 5. It will be understood that there are many different ways to install a replacement BIOS, and embodiments of the present invention should in no way be limited to any particular way (including the way described) of installing a BIOS (or other software or firmware). The procedure employs a platform and motherboard as described above with reference to FIGS. 1 and 2, and the trusted component 44, which is programmed to operate according to embodiments of the present invention.

In a first step [step 500], a user executes a BIOS update program, which is typically a software program provided by a platform OEM for the purposes of updating (or flashing) the BIOS firmware. In this example, we are considering a motherboard BIOS, for example as stored in BIOS memory 29. Next [step 505], the BIOS update program reads a new BIOS data file provided by the user. The data file may be downloaded from the Internet, or provided on removable storage, such as on a USB storage device, for example. The BIOS data file contains at least new BIOS firmware and, if the BIOS firmware has been approved by the OEM, for example, a respective digital signature and/or certificate generated by the OEM.

More generally, the BIOS data file, in addition to a new BIOS firmware, may contain any one or more of the following fields:

An update of the public key used to verify BIOS updates. This would be stored as the copy or digest 461 mentioned above.

An update of the value that the trusted component should expect the BIOS to record in a PCR when recording a measurement of the BIOS. The update would be stored as the expected BIOS measurement value 460.

An update of the PCR values that the trusted component should use to determine when BIOS measurements are being recorded in a PCR. As already indicated, these values may be PCR reset values, which exist by default before any measured values are recorded into the PCRs, and would be stored as the PCRs prior to BIOS measurement value(s) 460.

The aforementioned three values relate to the new update status of the platform that will exist when the associated BIOS update has been enacted.

A statement of whether the current public verification key must match a particular value, and that particular value. The statement indicates whether the update is intended only for a particular class of platforms. If so, the value indicates the particular class of platforms via the value of the verification key for that class of platforms.

A statement of whether the current expected BIOS measurement value must match a particular value, and that particular value.

A statement of whether current values of PCRs prior to BIOS measurement (used to recognise a BIOS measurement) must match a particular value or values, and those particular values.

The aforementioned two values relate to the most recent OEM-approved BIOS update status, which may not match the actual status of the BIOS if it has been replaced by an unapproved BIOS since the most recent OEM-approved BIOS update.

One or more signatures over the BIOS firmware and those of the above fields that may be present, signed by the key corresponding to the current public key(s) used to verify the BIOS update and the above fields.

According to the present embodiment, the BIOS update program determines whether the BIOS is approved [step 510], for example by authenticating the signature(s) or certificate, if present, using a public key of the OEM. The public key of the OEM that is used for verification is stored in the BIOS. The first version of that public key is preferably installed in the BIOS during manufacture. Later versions of that public key are preferably installed in the BIOS via an approved BIOS update program. If the BIOS firmware is not authenticated as having been approved by the OEM [step 510], the BIOS update program displays a strong warning message [step 515], for example, stating that the platform may be damaged or degraded, the platform's warranty may become void, securely stored data (current and future) may become inaccessible from protected storage and important services (such as trusted interactions with remote parties) may be invalidated or disabled, if the current BIOS is replaced with the new BIOS firmware. Next, the user is provided with a visual prompt [step 520], asking if they wish to continue with the BIOS update or not, bearing in mind the warnings. If the user elects not to continue, then the process ends [step 525].

If the user elects to continue with the unapproved BIOS update, the update process sets a Physical Presence Interface "unapproved BIOS update" flag (not shown), that at the next boot will cause the BIOS to obtain confirmation that the user really does want to install an unapproved BIOS update, and stores [step 535] the new unapproved BIOS firmware in a temporary storage area that persists during a reboot operation, for uploading to the BIOS memory 29 during the next boot cycle.

The Physical Presence Interface, used according to the present embodiment, is defined in the TCG Physical Presence Interface Specification, Version 1.10, Jun. 10, 2009. The Physical Presence Interface utilizes the industry-standard Advanced Configuration and Power Interface (ACPI) to provide a communication mechanism between an OS and a BIOS, enabling the OS and the BIOS to cooperate to provide a mechanism for administering the trusted component without sacrificing security. This Interface was designed under the assumption that trusted component commands requiring physical presence should only be executable in the pre-OS environment (or using System Management functions, as described above). In effect, the BIOS update program can issue commands that are stored (for example in a known non-volatile storage location of the platform, trusted component or removable storage) and then are only acted on after a platform reset. In the present context, physical presence requires that a user is present during an operation, and typically requires the user to prove presence by interacting with the platform, either by pressing a button, which is hard-wired to the trusted component, or by pressing one or more keyboard keys, when prompted to do so by a boot operation. The physical presence operation may take place as part of a CRTM process, and is preferably done before a network stack is enabled or rogue software can be executed. The purpose of requiring physical presence is to reduce the risk that a local or remote software attack on the platform could lead to subversion of the platform, such as during replacement of the BIOS. While use of the Physical Presence Interface is not necessary, according to embodiments of the present invention, there are advantages of its use. In alternative embodiments, additional or alternative security procedures may be adopted, for example, as allowed by the TCG's Provisioning Authorisation specification. That specification explains that there can be alternative methods to physical presence when obtaining verification that an action has been approved by a user. Such methods might include a cryptographic process that verifies a digital signature from a remote entity, for example.

If the user elects to continue with the unapproved BIOS update [step 520], the BIOS update program enforces a system reset in order to cause the platform to re-boot [step 550].

If, on the other hand, the BIOS firmware is found [step 510] to be approved by the OEM, the BIOS update program issues a trusted component update parameters command [step 540], the result of which is described below, sets an approved BIOS update flag (not shown) [step 545], stores the new BIOS firmware in a temporary storage area that persists during a reboot process [step 535], for uploading to the BIOS memory 29, and enforces a system reset in order to cause the platform to re-boot [step 550]. In this embodiment, the approved BIOS update flag, unlike the unapproved BIOS update flag, is not associated with a physical presence requirement, and can therefore be acted upon in later steps without requiring proof of physical presence.

After reset, the existing CRTM code is executed [step 555] and the code carries out a series of checks, including inspecting the update flags [step 555]. Only the CRTM steps that are relevant to the present process are illustrated in FIG. 5: other, different known steps, which are not shown, would typically also be executed. If the Physical Presence Interface "unapproved update" flag is set, the BIOS causes a visual indication [step 560] to the user that requests confirmation of an unapproved BIOS update and detects the physical action [step 565] that provides that confirmation (or uses another Provisioning Authorisation method to provide confirmation). If the unapproved update is confirmed, the BIOS installs the unapproved BIOS update in the BIOS, using a known flash process [step 570], resets the "unapproved update" flag, to prevent the process being initiated again next time the platform is reset, and deletes the copy of new unapproved firmware from the respective temporary storage area [step 575] and then reboots the platform [step 580] in order to initiate start-up of the platform in the known way, under control of the new BIOS firmware. If the physical action is not detected [step 565], the BIOS resets the "unapproved BIOS update" flag, deletes the copy of new unapproved firmware from the respective temporary storage area [step 585] and then continues with the current reboot of the platform [step 590].

Alternatively, if the 'approved BIOS update' flag is set [step 555], the BIOS update program updates the trusted component parameters in the TPM [step 595], according to the update command issued earlier [at step 540]. The BIOS installs the approved BIOS update in the BIOS [step 570], resets the "approved update" flag, to prevent the process being initiated again next time the platform is reset, and deletes the copy of new approved firmware from the respective temporary storage area [step 575] and then reboots the platform [step 580] in order to initiate start-up of the platform in the known way, under control of the new BIOS firmware.

In alternative embodiments, the BIOS update parameters may be updated at different times, for example: before rebooting the platform [step 550]; after rebooting the platform [step 550] and before installing the new BIOS; or after rebooting the platform [step 550] and after installing the new BIOS but before rebooting the platform again (updating the BIOS update parameters is preferably implemented by sending an update BIOS parameters command to the trusted component 44, in step 620 described later).

Figure 5:
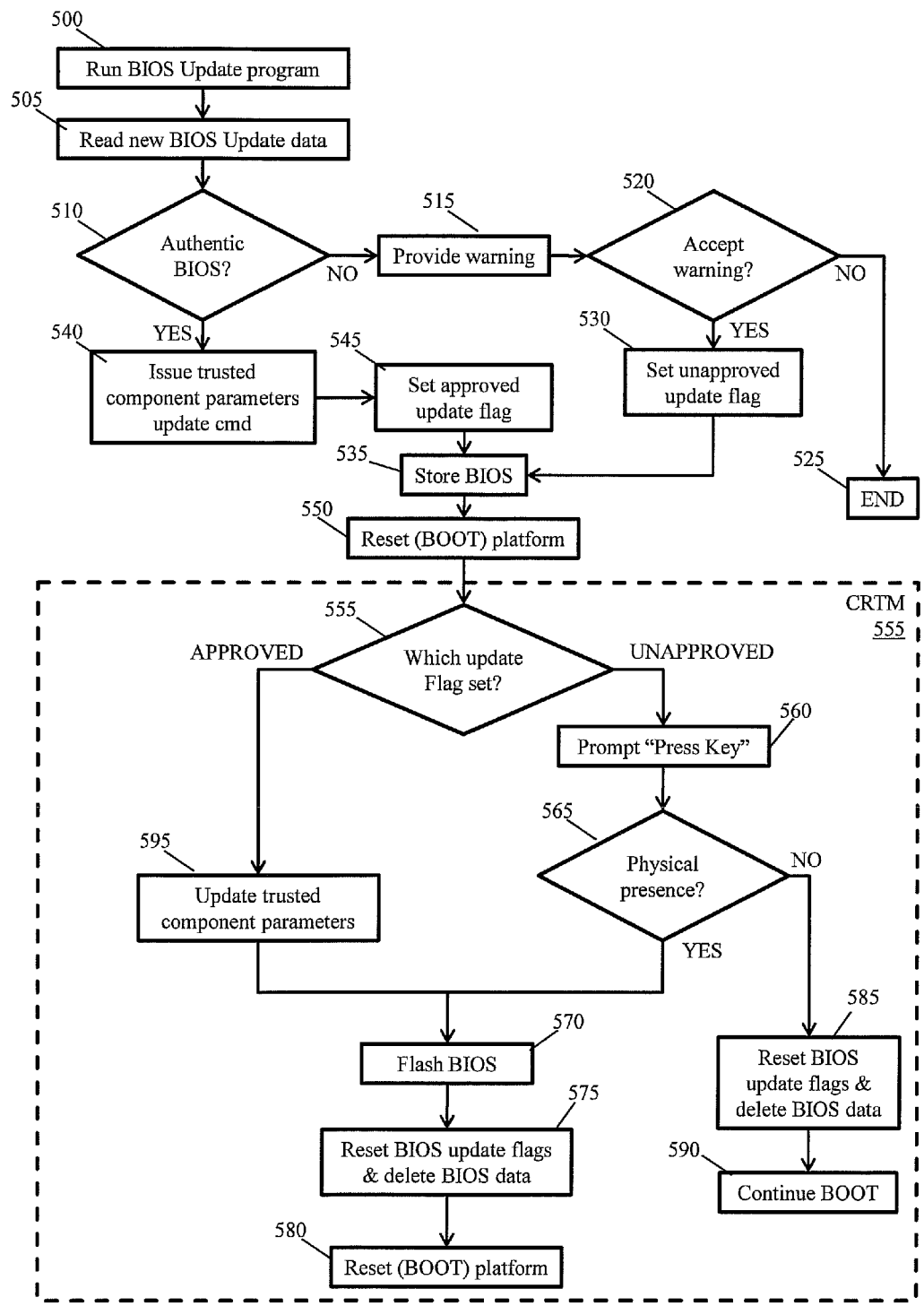
FIG. 5 is a flow diagram of a BIOS update process according to an embodiment of the present invention.

A number of the steps illustrated in FIG. 5 are described as being part of the CRTM code. It will be appreciated that this is only one way of updating the BIOS of a trusted computing platform according to an embodiment of the present invention. In other embodiments, the CRTM code may encompass more or fewer instructions. Indeed, other processes may be employed for enacting at least some of the steps (or equivalent or similar steps), without departing from the teaching herein.

Figure 6A:
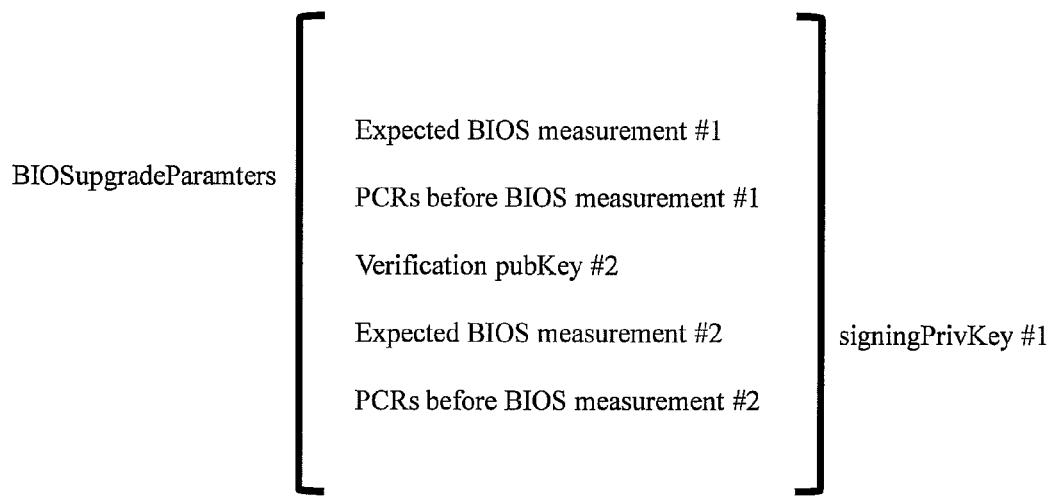
FIG. 6a illustrates the structure of a BIOS update command according to an embodiment of the present invention.

An exemplary trusted component parameters update command package, BIOSupgradeParameters, is illustrated in FIG. 6a and includes the arguments: Expected BIOS measurement #1, which is the current expected value of measured BIOS firmware; PCRs prior to BIOS measurement #1, which is the current value of PCR values before BIOS measurements are to be extended into the PCRs (and may be the PCR reset values, as already indicated); VerificationpubKey #2, which is the public key to be used to verify future packages of BIOSupgradeParameters; Expected BIOS measurement #2, which is the future expected value of measured BIOS firmware; and PCRs prior to BIOS measurement #2, which is the future value of PCR values before BIOS measurements are to be extended into the PCRs. The arguments are signed using signingPrivKey #1, which is the OEM's private signing key. The current values (labelled with #1) are included if the BIOSupgradeParameters command is intended to force the trusted component to verify in detail that the command is applicable to that trusted component. If the current values are present, the TPM must compare the #1 parameters with the corresponding values stored inside the trusted component, and reject the package if the comparison fails. If the comparison is successful, on the other hand, the package is rejected only if the signature on the package is incorrect.

Figure 6B:
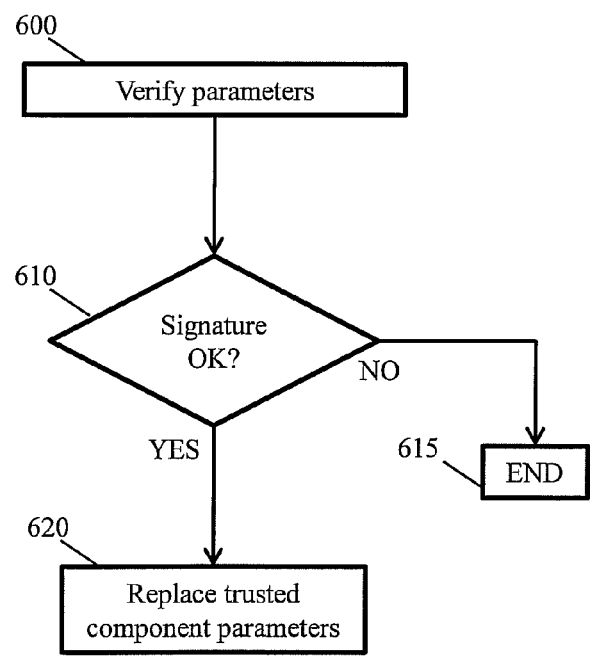
FIG. 6b is a flow diagram of a BIOS update authentication process according to an embodiment of the present invention.

An exemplary process for updating the trusted component parameters, which corresponds to step 595 of the flow diagram in FIG. 5, is illustrated in the flow diagram in FIG. 6b. This process, in effect, revises the expected BIOS measurement parameters stored inside the trusted component.

According to FIG. 6b, the CRTM uses a public key counterpart, verificationPubKey #1, of the signingPrivKey #1, to verify [step 600] that the signature was produced using signingPrivKey #1 belonging to the OEM. The public portion of the OEM's signing key, verificationPubKey #1, is originally installed in the trusted component during platform manufacture. Later versions of verificationPubKey are installed in the trusted component after successful verification of BIOSupgradeParameters packages. If the signature is verified [step 610], the CRTM communicates with the trusted component to update the relevant parameters [step 620]. In particular: the Verification pubKey #2 replaces Verification pubKey #1; Expected BIOS measurement #2 replaces Expected BIOS measurement #1, as the expected BIOS measurement value 460; and PCRs prior to BIOS measurement #2 replaces PCRs prior to BIOS measurement #1, as PCRs prior to BIOS measurement values 456. If the signature is not verified [step 610], then the process ends [step 615].

A process that the trusted component uses when verifying BIOS measurements during each boot process will now be described with reference to the functional logic diagram in FIG. 7, which represents respective program logic of the controller 40. The same process is used on each system reset (reboot) in order to keep track of the number of times the platform has been reset under an unapproved BIOS. The process is programmed into the controller 40 of the trusted component 44. Other, known processes of the controller 40 are not shown.

Figure 7:
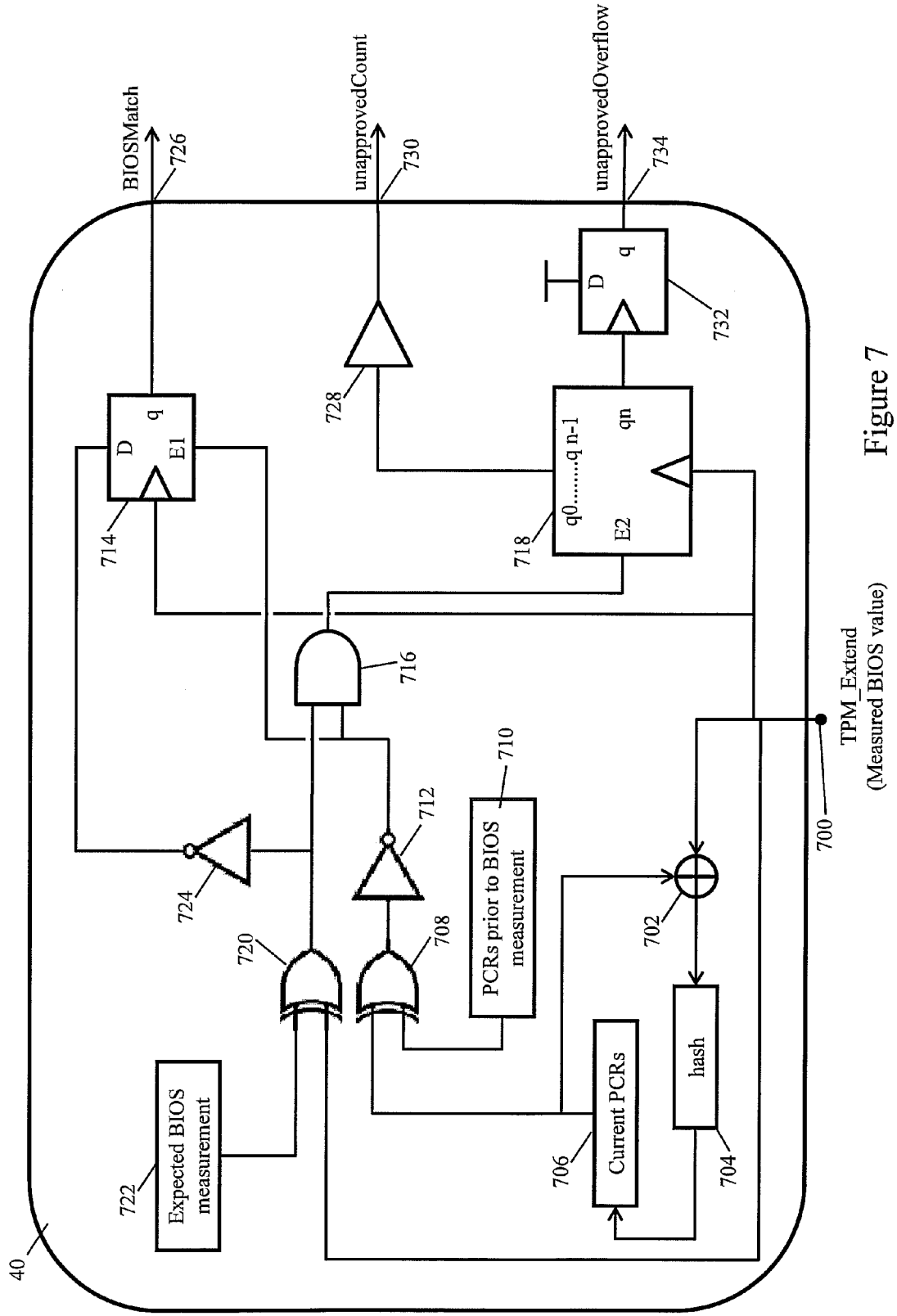
FIG. 7 is a functional logic diagram illustrating the functional logic in a trusted entity for updating a current update status of a BIOS program according to an embodiment of the present invention.

According to FIG. 7, the controller 40 receives an extend command (TPM_Extend) at an input 700, including a newly measured value of some program code and an identity of the respective PCRs associated with the measurement. The extend command is a request to store a hash of the measured value into the associated PCR. In practice, and in accord with known TCG standards, an extend command causes the measured value to be appended to the previously stored PCR value, by adder 702, and the result is hashed by hash function 704 and stored as a newly measured (i.e. current) PCR value in a first store 706, as already described with reference to FIG. 3b. A first XOR function 708 has a first input comprising the current PCR values 706 and a second input comprising the specified 'PCRs prior to BIOS measurement' value(s) 456 (these values would be either original values provided by the OEM when the platform was shipped, or provided as parameter values in any subsequent BIOSupgradeParameters command, as described above). The current PCRs 706 will match the PCRs prior to BIOS measurement value 710 when the BIOS measurement is enacted.

The output of the first XOR function will be a zero if the two inputs are the same or a one if the two inputs are different. The output of the first XOR function 708 serves, via a first NOT function 712, as an enable input E to a first latch function 714 and as a first input to an AND function 716. The output of the AND function 716 serves as an enable input E into a counter function 718.

The measured value of the BIOS also serves as a first input of a second XOR function 720. The second XOR function 720 receives as a second input a value that should be the expected BIOS measurement value 460. The expected BIOS measurement value 460, according to the present embodiment, will be Expected BIOS measurement #1 or Expected BIOS measurement #2, depending on whether the value has been updated at step 595 in FIG. 5. As already described, the value will typically have been updated if the new BIOS firmware was approved by the OEM but not otherwise. The output of the second XOR function 720 serves as a second input to the AND function 716, and, via a second NOT function 724, as a second input D into the first latch function 714. The output of the second XOR function will be a zero if the two inputs are the same or a one if the two inputs are different.

The extend command also serves as clocking inputs to the first latch function 714 and to the counter function 718 (that is, the clocking input becomes one, or is enabled, when the extend command is received, and is zero, or is disabled, at other times). The first latch function 714 operates such that when both the E input and the D input are one, the output q changes to (or remains) one (or TRUE), when the clocking input is the enabled. The counter 718 operates to increment its output, q0 . . . qn−1, when the E input is one and the clocking input is enabled, and switches the output qn to one when the counter reaches its maximum value.

The output q of the first latch function 714 provides a first signal output 726, which indicates, as one (TRUE) or zero (FALSE), whether the latest measurement of the BIOS is as expected; the value is stored as the BIOSMatch flag 457.

The first outputs q0 . . . qn−1 of the counter 418, via a buffer function 728, provides a second output signal 730, which is a count of the number of times the BIOS measurement has not been as expected; the value is stored as the unapprovedCount register value 458. The second output of the counter qn, acting via a second latch 732, to which it serves as a clocking signal, provides a third output signal 734, which is an overflow signal indicating when the counter has reached its maximum count value qn before cycling back to zero; the value is stored as the unapprovedOverflow flag 459.

Figure 8:
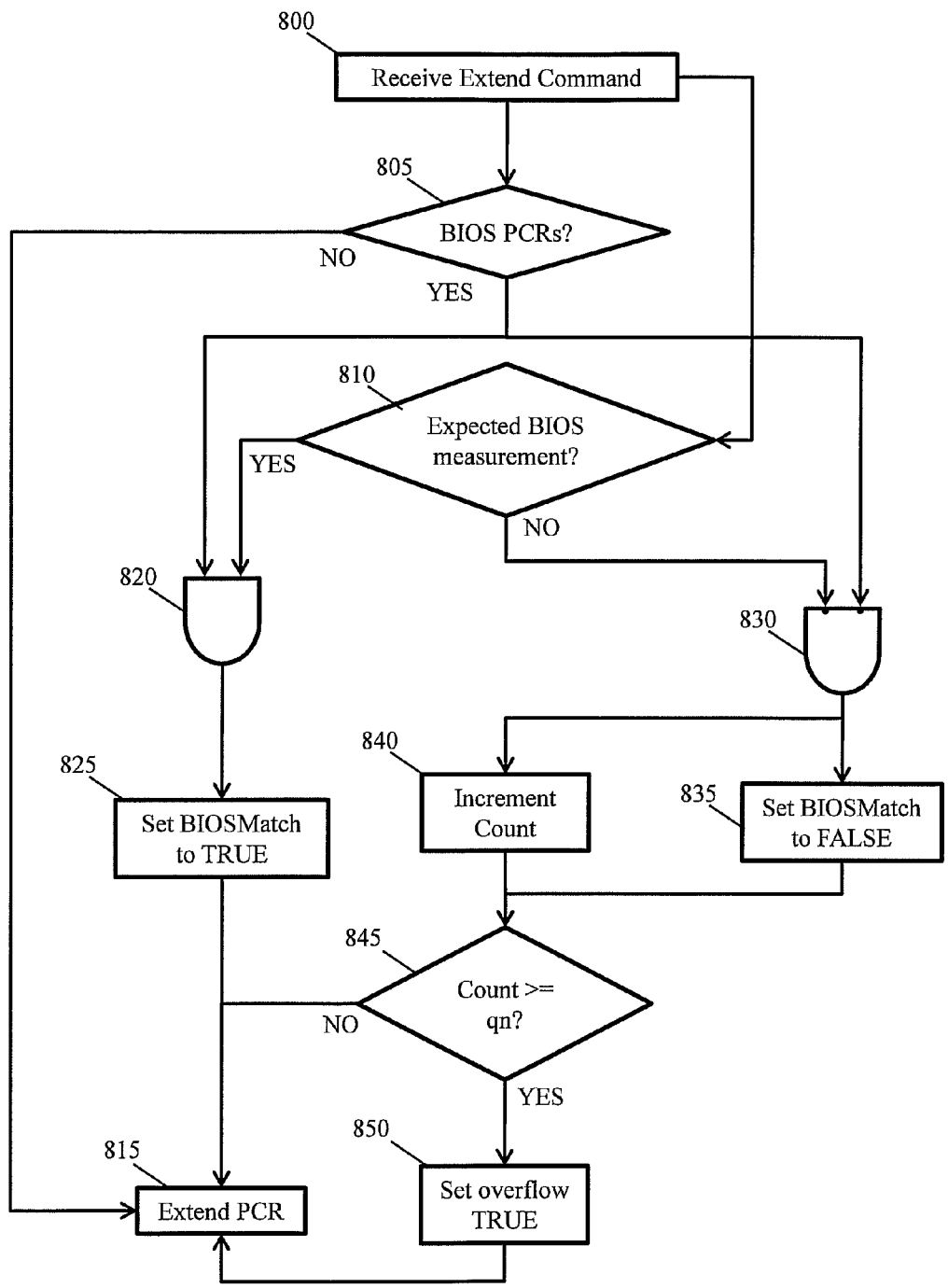
FIG. 8 is a flow diagram illustrating the operation of the functional logic of FIG. 7.

The functional operation of the logic diagram in FIG. 7 will now be described with reference to the flow diagram in FIG. 8. In a first step [step 800], the controller 40 receives an extend command including a measured value and an indication of the PCRs to which the value relates. In parallel steps, the command is checked [step 805] to see whether the respective PCRs are currently in the state that indicates that the measurement is a BIOS measurement, and the BIOS measurement is checked [step 810] to see if it matches the expected BIOS measurement value 460. If the PCR values are not the 'PCRs prior to BIOS measurement' 456, then the received respective PCRs are extended [step 815] in the normal way. If the PCRs are the 'PCRs prior to BIOS measurement' 456, AND [step 820] the BIOS measurement value is the expected BIOS measurement value 460, then the BIOSMatch flag 457 is set to one (TRUE) [step 825], and the PCRs are then extended [step 815] in the normal way. On the other hand, if the PCRs are the 'PCRs prior to BIOS measurement' 456, AND [step 830] the BIOS measurement value is NOT the expected BIOS measurement value 460, then, in parallel steps, the BIOSMatch flag 457 is set to zero (FALSE) [step 835] and the unapprovedCount register value 458 is incremented by one [step 840]. Next, if the unapprovedCount register value 458 has reached its maximum qn [step 845], the unapprovedOverflow value 459 is set to one (TRUE) [step 850] and the PCRs are extended [step 815] in the normal way. If the unapprovedCount register value 458 has not reached its maximum qn [step 845], the PCRs are extended [step 815] in the normal way. The entire process would be re-enacted for each received extend command.

In summary, a trusted component programmed as described above is able to indicate, via current update status indicators, that a BIOS, which has not been approved by the OEM, has been installed onto a respective computing platform. Moreover, the indication (in the form of the unapprovedCount register value 458 and the unapprovedOverflow flag 459) remains even after an unapproved BIOS has been replaced by an approved BIOS; resulting in the BIOSMatch flag 457 reverting to TRUE. This capability can be utilized as will now be described.

Figure 9:
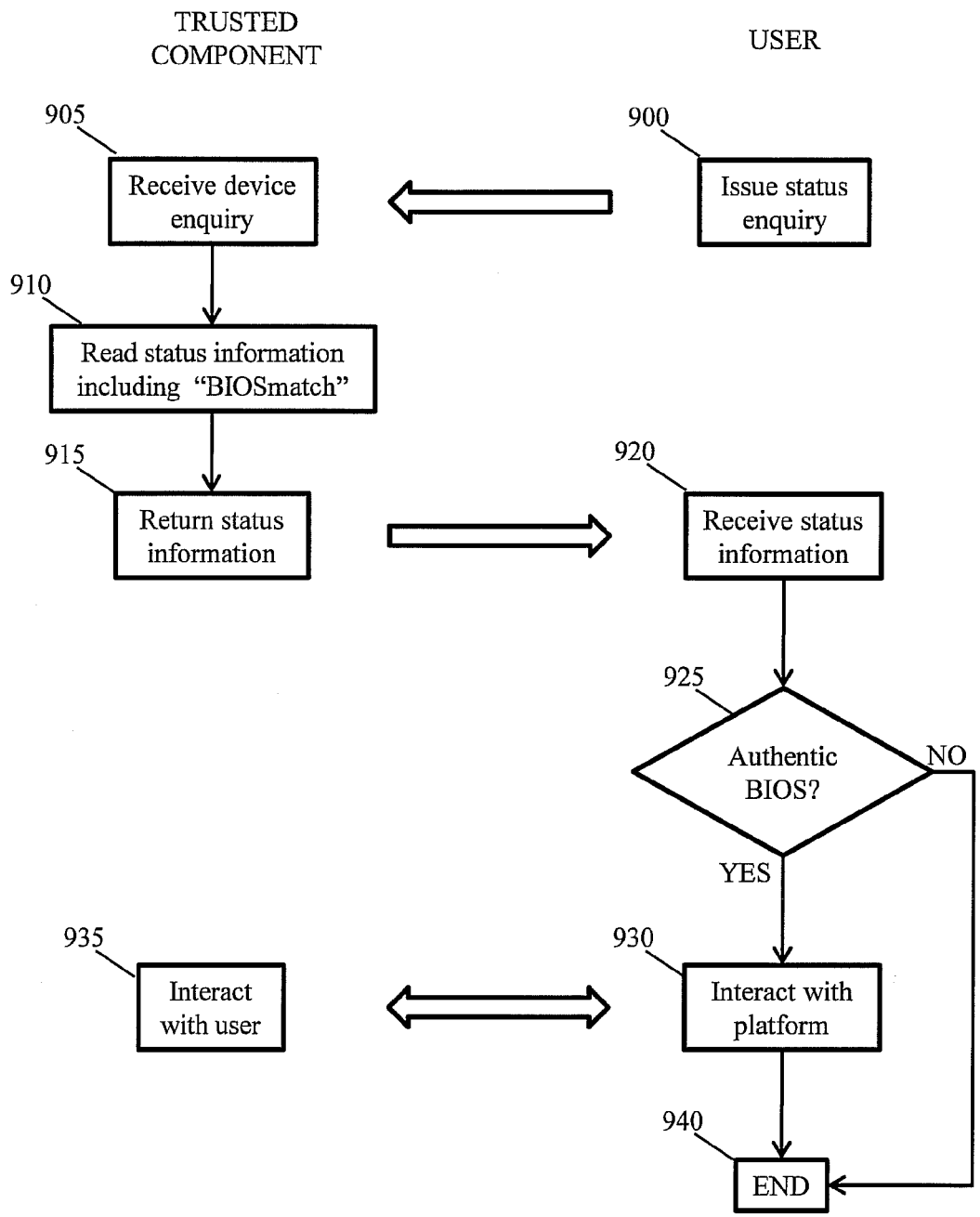
FIG. 9 is a flow diagram of a current update status enquiry process according to an embodiment of the present invention.

According to a first exemplary use, a trusted component according to an embodiment of the present invention can inform local or remote users that the platform in which the trusted component is installed is (or is not) operating under a BIOS that has been approved by the OEM of the platform. According to the flow diagram in FIG. 9, a user issues a trusted component status enquiry [step 900], for example in the form of a TPM_getCap or TPM_Quote command, to a computing platform in which the trusted component is installed. The user may be a local or remote user of the platform. The trusted component receives the enquiry [step 905] and, in response, reads the information that is associated with the enquiry [step 910], including, according to the present embodiment, the BIOSmatch flag 457, the unapprovedCount register value 458 and the unapprovedOverflow flag 459. The trusted component then returns the information to the user [step 915]. The user receives the information [step 920] and determines [step 925] whether the platform BIOS, under which the platform is operating, is approved by the OEM of the platform, and/or whether the platform has at any time operated under an unapproved BIOS. If the BIOS is approved by the OEM, and has not in the past operated under an unapproved BIOS, then the user (or his platform) interacts with the platform in which the trusted component is installed [steps 930 and 935]. If the BIOS is not approved by the OEM, the user does not trust the platform and the process ends [step 940] with the user not interacting with the platform in which the trusted component is installed. Of course, in practice, the user might still use the platform, even though it is not trusted, but the user will at least be aware of the potential risks associated with doing so.

Figure 10:
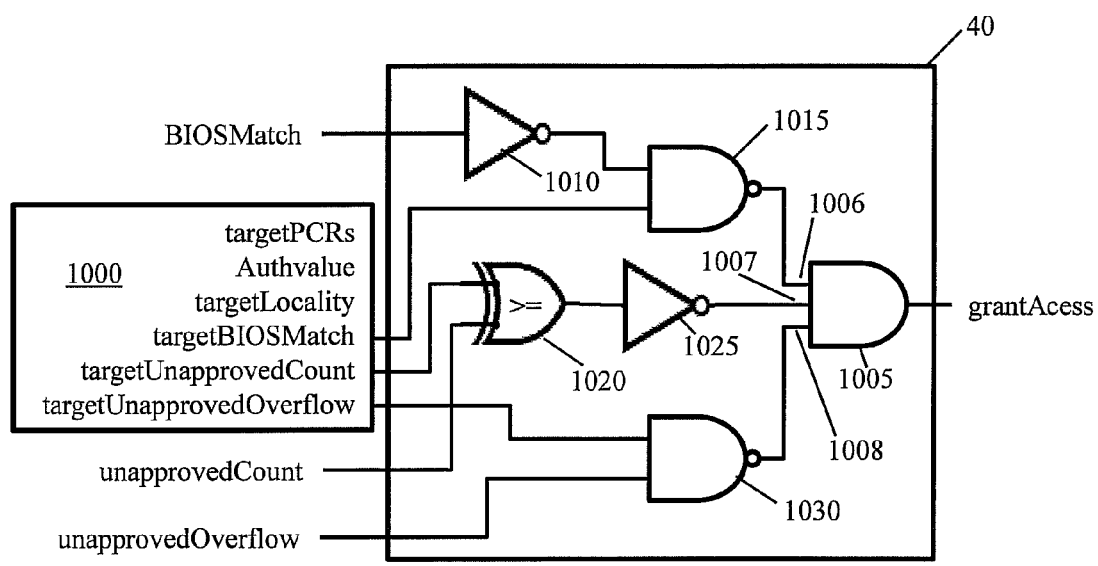
FIG. 10 is a functional logic diagram illustrating exemplary program logic for determining whether a current BIOS environment is suitable, according to rules stored with the information, for releasing the information to a requesting user, according to an embodiment of the present invention.

According to a second exemplary use, a trusted component according to an embodiment of the present invention is able to prevent revelation of information (for example data or a key), that has been sealed under an approved BIOS, if the BIOS is subsequently replaced by an unapproved BIOS. The functional logic diagram in FIG. 10 illustrates exemplary program logic for determining whether a current BIOS environment is suitable, according to rules stored with the information, for releasing the information to a requesting user. The functionality is programmed into the controller 40 of a trusted component. The logic reads as inputs the BIOSMatch flag 457, the unapprovedCount register value 458 and the unapprovedOverflow flag 459, which have been generated as described above. As additional inputs, the logic reads criteria 1000 from a blob, which has been recovered (i.e. loaded from trusted storage into the trusted component) by the trusted component, in response to a respective request from the user. The criteria 1000 comprise: targetBIOSMatch, which is a bit that indicates whether or not the current BIOS must be OEM-approved; targetUnapprovedCount, which is a value that indicates the number of allowable times the platform has booted under an unapproved BIOS (this may be zero or more); and targetUnapprovedOverflow, which is a bit that indicates whether it is allowable for the UnapprovedCount 458 to have rolled over its maximum value qn.

According to the diagram in FIG. 10, the sealed information in the blob is revealed to the user if the output of an AND function 1005 is one (TRUE). The AND function 1005 has three inputs, 1005, 1007 and 1008, each of which must be TRUE for the output to be true.

The first AND function input 1006 is the result of inverting the BIOSmatch flag value 457, using a first NOT function 1010, and applying the result to a first NAND function 1015 along with the targetBIOSMatch value from the criteria 1000 in the blob. The output of the first NAND function 1015 will only be zero if the BIOSMatch flag 457 is zero and the targetBIOSMatch value is one.

The second AND function input 1007 is the result of an XOR function 1020, taking as inputs the targetUnapprovedCount value from the criteria 1000 in the blob and the unapprovedCount register value 458. The output of the XOR function 1020 is inverted via a second NOT function 1025 before being input to the AND function 1005. The XOR function 1020 operates to provide a one output, which becomes a zero input to the AND function 1005 by virtue of the second NOT function 1025, if the unapprovedCount register value 458 is equal to or exceeds the targetUnapprovedCount value from the criteria 1000 in the blob.

The third AND function input 1008 is the result of a second NAND function 1030, taking as inputs the targetUnapproved overflow from the criteria 1000 in the blob and the unapprovedOverflow flag 459. The input to the AND function 1005 is zero only if both the targetUnapprovedOverflow value and the unapprovedOverflow flag 459 are one.

In effect, the program logic depicted in FIG. 10 refuses to reveal the sealed information when the BIOSMatch flag 457 is zero (FALSE), or when the unapprovedCount value is equal to or greater than the targetUnapprovedCount, or when the unapprovedOverflow flag 459 is one (TRUE). The criteria 1000 may in addition include conventional TCG access control mechanisms, including one or more of: target PCRs, targetPCRs, which are declared when the data was stored and which must match the respective PCRs in order for the data to be released to the software application; an authentication value, Authvalue, which must be provided by the software application in order for the data to be released; and a target locality, targetLocality, which are declared when the data was stored and must match the signals to the trusted component that indicate the type (normal application, trusted application, trusted OS, trusted CPU, for example) of software issuing the command to the trusted component.

Figure 11:
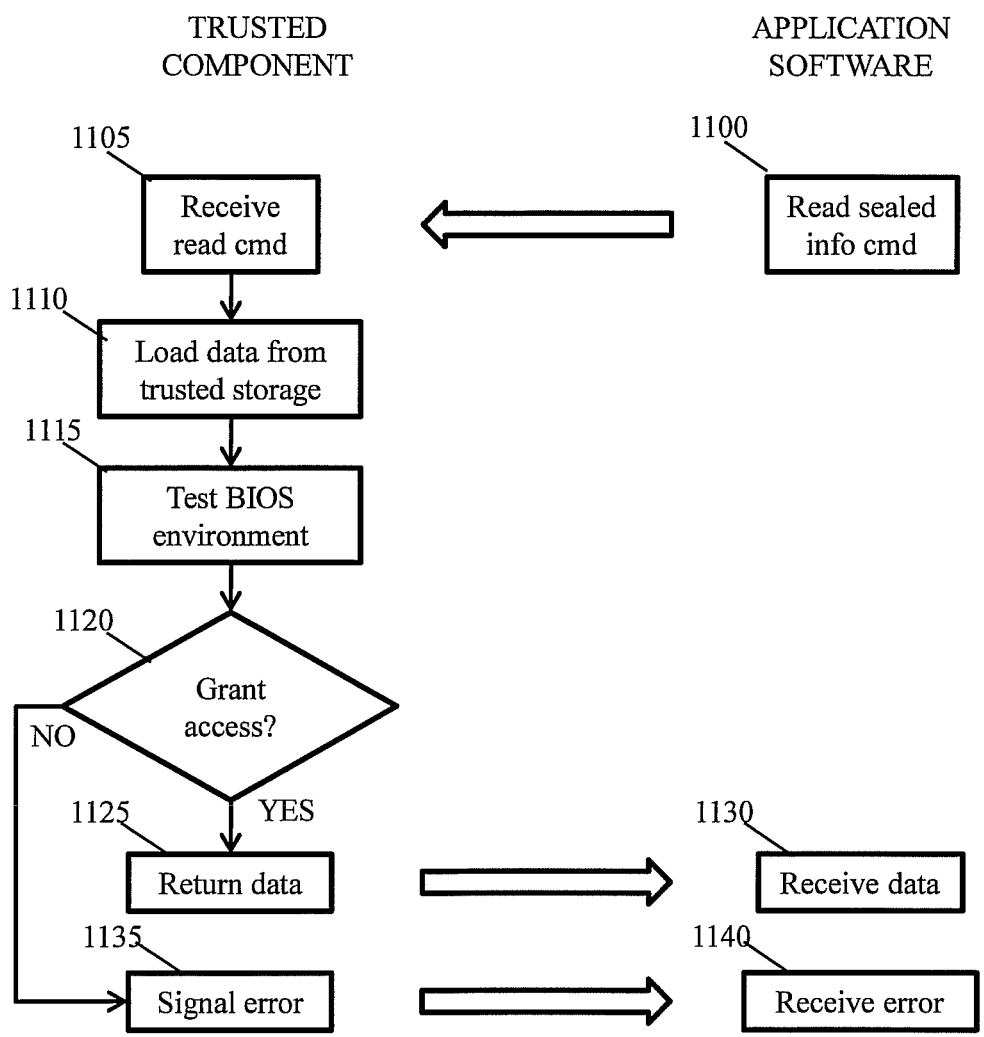
FIG. 11 is a flow diagram illustrating the operation of the functional logic of FIG. 10.

The operation of the program logic of FIG. 10 will now be described with reference to the flow diagram in FIG. 11. In a first step [step 1100], a user (for example via a software application) requests, via an appropriate command, specified information, which is stored in a blob, to be revealed. The trusted component receives the request [step 1105] and loads the respective blob from trusted storage [step 1110]. The trusted component then tests the BIOS environment [step 1115], as described above with regard to FIG. 10, to ensure that the BIOS environment matches the criteria 1000 that are specified in the loaded blob. If the criteria match [step 1120], the respective information is revealed to the user [step 1130]. If the criteria do not match [step 1120] then the trusted component signals an appropriate error to the user [step 1135], and the user receives the signal [step 1140].

The above embodiments are to be understood as illustrative examples of the invention. Further embodiments of the invention are envisaged. For example, while the embodiment has concentrated on an update status of BIOS firmware, the same principles may be applied to an update status of any program code, such as other firmware or system software (such as all or part of an operating system) or application software. In addition, while the status indicators (the BIOSMatch flag 457, the unapprovedCount register value 458 and the unapprovedOverflow flag 459, in the examples provided) are stored on board the trusted component, they could be stored in other non-volatile trusted storage, for example sealed in blobs; although there is a risk in this case that the information could be deleted and lost.

It is to be understood that any feature described in relation to any one embodiment may be used alone, or, if the context permits, in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A computing platform comprising:
    a hardware trusted entity having a non-volatile memory, said non-volatile memory including,
        a code measurement function to acquire a measurement of an executable program code;
        one or more expected values associated with the acquired measurement of the executable program code; and
        one or more indicators that indicate a current update status of the executable program code, wherein the one or more indicators include an authorized program code indicator to indicate whether the executable program code is an authorized executable program code, and a persistent counter indicator that is to be incremented each time the authorized program code indicator indicates that the executable program code is not an authorized program code, and
    wherein the hardware trusted entity is to update the one or more indicators in response to a comparison of the one or more expected values and the acquired measurement of the executable program code.

2. The computing platform according to claim 1, wherein the hardware trusted entity is to perform the comparison in response to a boot of the computing platform.

3. The computing platform according to claim 1, wherein the hardware trusted entity is to acquire a measurement input, and based on a comparison with associated values of the one or more expected values, determine that the measurement input relates to the measurement of the executable program code.

4. The computing platform according to claim 3, wherein the associated expected values are platform configuration register (PCR) values prior to the measurement of the executable program code.

5. The computing platform according to claim 1, wherein to determine whether the executable program code is authorized executable program code, the hardware trusted entity is to acquire a measurement input including the measurement of the executable program code, and to determine, based on a comparison of the measurement of the executable program code to associated expected values of the one or more expected values, whether the executable program code is authorized executable program code.

6. The computing platform according to claim 1, wherein the one or more indicators include a persistent overflow indicator that indicates an overflow if the persistent counter indicator reaches a maximum count.

7. The computing platform according to claim 1, wherein the hardware trusted entity is to indicate to a user the one or more indicators.

8. The computing platform according to claim 1, wherein the hardware trusted entity is to seal data using the current update status at a time of the sealing, and in response to a request to output the data, to output the data only if the current update status, at a time of the request, matches the current update status at the time of sealing the data.

9. The computing platform according to claim 1, wherein the hardware trusted entity is to replace one or more of the expected values with authenticated replacement expected values.

10. The computing platform according to claim 9, wherein the non-volatile memory further comprises a copy or digest of a public key of a trusted party to be used to authenticate the replacement expected values.

11. The computing platform according to claim 9, wherein the hardware trusted entity is to replace the one or more expected values with the authenticated replacement expected values in response to an update to the executable program code with an approved executable program code.

12. The computing platform according to claim 1, wherein the computer platform is to identify that a requested update to the executable program code is an unapproved update, and to indicate to a user that the update is unapproved prior to allowing the update to take place.

13. The computing platform according to claim 12, wherein a physical presence of the user is required for the computer platform to permit the update to take place.

14. The computing platform according to claim 1, wherein the hardware trusted entity is not to reset at least one of the one or more indicators if an unapproved executable program code is subsequently replaced by an approved executable program code.

15. The computing platform according to claim 1, wherein the executable program code is BIOS firmware program code.

16. A hardware trusted component comprising:
    a non-volatile memory having stored therein:
        a code measurement function for acquiring a measurement of an executable program code;
        one or more expected values associated with the measurement of the executable program code; and
        one or more indicators, that indicate a current update status of the executable program code,
    wherein the hardware trusted component is to update the one or more indicators in response to a comparison between the one or more expected values and the acquired measurement of the executable program code, and
    wherein the one or more indicators include an authorized program code indicator and a persistent count indicator to be incremented each time the authorized program count indicator indicates that the executable program code is not an authorized executable program code.

17. A non-transitory computer program product comprising machine readable instructions recorded thereon, which, when executed by a computer, implement a method for updating one or more indicators that indicate a current update status of an executable program code, said machine readable instructions comprising code to:
    acquire a measurement of the executable program code;
    compare the acquired measurement with one or more expected values associated with the acquired measurement; and
    update one or more indicators that indicate a current update status of the executable program code in response to a comparison of the acquired measurement and the one or more expected values of the executable program code,
    wherein the one or more indicators include an authorized program code indicator and a persistent count indicator to be incremented each time the authorized program count indicator indicates that the executable program code is not an authorized executable program code.

18. The computing platform according to claim 1, wherein the one or more indicators further include a persistent overflow indicator to indicate an overflow if the persistent counter indicator reaches a maximum count.

\* \* \* \* \*